L. Kittenger,
Cage Trap.

Nº 4,681. Patented Aug. 8, 1846.

UNITED STATES PATENT OFFICE.

LEVI KITTINGER, OF EAST GREENVILLE, OHIO.

RAT-TRAP.

Specification of Letters Patent No. 4,681, dated August 8, 1846.

*To all whom it may concern:*

Be it known that I, LEVI KITTINGER, of East Greenville, in the county of Stark and State of Ohio, have invented a new and Improved Rat-Trap; and I do hereby declare that the following is a full and exact description.

To enable others skilled in the art to make and use my invention I will proceed to describe its construction and operation.

Figure 1 is a perspective view of the trap when set for operation. This trap may be constructed of any convenient size for a trap and may be composed either of all wood or of wood and iron combined, and consists of an oblong box with the sides and ends either latticed or made with slats running perpendicular from bottom to top parallel to each other, and from one fourth to half an inch apart; with treadles, sliding gates, crank, weight, pulleys, rockers, springs, and slides.

Letter A is a double crank with two pulleys L L, one in the center and the other on the end of the crank—that in the center has an iron pin running through its diameter and extending one fourth of an inch beyond its periphery to form a catch on which the hook on the end of lever D is hooked as at M, Figs. 1 and 4—that on the end is to wind the cord on when the trap is to be set.

B B represents the sliding gates. These are attached to the sweeps of the crank at *a a* by means of pitman rods as represented by C C, the one end being attached to the crank and the other on the top of the sliding gates B B near their front end, by means of a hinge or wire staple passing through the pitman rod into the tops of the sliding gates. The back ends of these sliding gates are kept to their places by means of wire staples as represented by N. The wire staples N slide on the wire slides O that are fastened on the top of the box or trap in the form of a staple, and are of sufficient length to correspond with the motion and sweep of the double sweep crank A. This crank is kept to its place by means of two posts about two and a half inches long on the top of the box or trap as represented by P P and to which posts it is attached.

The lever D is attached to the top of the post Q which stands on top of the trap, about one third the distance from its front end to where it hooks on the pin in the center pulley L as in Figs. 1 and 4. This makes the back end of the lever D the heaviest and keeps it hooked so as to keep the crank A from turning.

Letter E is a double inclined plane, nearly in the form of a right angle triangle with its base, perpendicular, and hypotenuse projecting over its side, standing on its base on top of the trap in the center near the front end thereof, and fastened to it, with the hypotenuse toward the back end of the trap as represented by Figs. 1 and 4, the base of the triangle forming the lower inclined plane, as represented by *e* over which the wire points in the edge of the sliding gate B, (and which rests on the hooks F F when the gate is hoisted,) passes as the gate is drawn back in the act of closing the trap.

Letter *d* is the hypotenuse of the triangle, or the upper inclined plane over which the same wire points passes in hoisting the gate to set the trap. The front end of lever D passes over the upper corner or angle of the double inclined plane E and down a groove in its front edge, which is perpendicular, and turns under forming a stirrup, as represented by S, Figs. 1 and 4.

Letter K represents the rockers, which are made in the form of a square or right angle, and are attached to the top of the post R, (which is about 2½ inches high) on the upper side of the trap, by means of a wire passing through their angle, as represented by K Figs. 2 and 4. On the lower points of these rockers there is a wire attached which passes down through the trap and is fastened to the treadle in the bottom of the trap, as represented by letter T Figs. 2 and 4. There are also wires attached to the upper points of the angles or rockers, and running parallel with the top of the box to its front end, and hooking around the upper angle of the inclined plane E in grooves immediately under the front end of the lever D, as represented by *g*, Fig. 4; the wires and hooks are represented by F Figs. 2 and 4, and also by *r* Fig. 1.

Letters I I Figs. 2 and 4 represent the treadles in the bottom of the box which is about one inch thick. These treadles are made of thin plank, say one fourth of an inch thick, and are fastened at their front ends by means of a wire hinge, on the under side, to the bottom of the trap. The bottom of the trap on the upper side in front is in the form of an inclined plane, and the treadles are pressed up from below by means of wire springs (represented by Fig. 5) on the under side of the trap so as to represent the surface of an inclined plane as at letter U Figs. 2 and 4.

Letter J is an inner gate as represented in Figs. 2 and 4. There is one of these for each sliding gate. These gates are opened and shut by means of a wire spring which is attached to the gate post near its lower end in front, and passes down through the treadle, as represented by V Figs. 2 and 4. As the treadle is pressed down by any weight upon its upper surface, it presses upon the spring V and this swings the gate open toward the inner chamber of the trap, and as the weight is removed from the treadle, the spring under the bottom again presses it to its place and thus closes the inner gate.

Letter W on the black line Figs. 1 and 4 represents a wire spring fastened to the upper angle of the double inclined plane E and passing nearly in a straight line toward its lower angle, then forming a curve at the angle, passes along immediately above the lower inclined plane e until its point comes in contact with the lower angle of the hypotenuse, or upper inclined plane d. The object of this spring is to perfect the lower angle of the inclined plane d by filling up the groove in its lower angle through which the wire points, in the edges of the sliding gates pass over the lower inclined plane e in closing the trap; and in hoisting the sliding gate these wire points pass over the points of the wire spring W up the upper inclined plane d. On the inner edge of each sliding gate near the front end there is a wire point or pin which, when the sliding gate is hoisted, rests on the hooks F Figs. 2 and 4, and when the gate is let down strikes the stirrup S and from thence passes over the lower inclined plane e in closing the trap, and in opening or setting the trap passes over the upper inclined plane as above described.

X is the hole through which the bait is placed in the cell, which is a separate apartment from the main chamber of the trap, running along side of the treadle. There is one of these opposite each treadle.

Letter L is a post, which may be made of any convenient length, at the back end of the trap, with a pulley on its top over which the cord that is attached to the pulley on the end of the crank passes, and to the end of which cord the weight Y is suspended.

Figure 3:
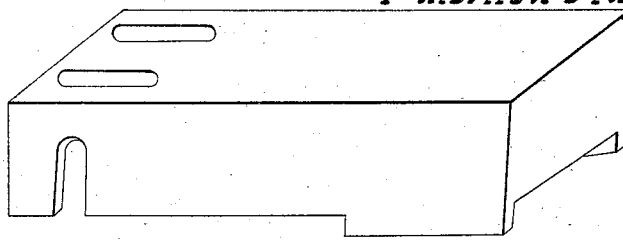
Fig. 3 is a box designed to cover the machinery on the top of the trap.
Figure 1:
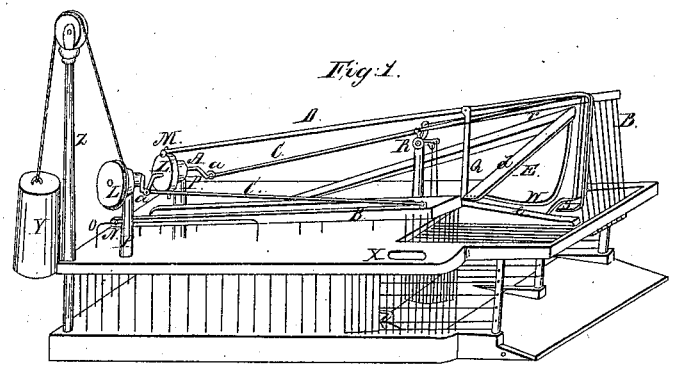
Figure 2:
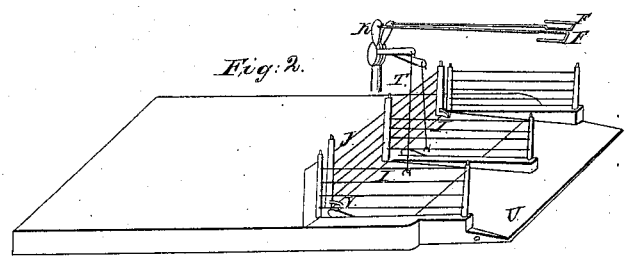
Fig. 2 is a perspective view of the bottom of the trap with the inner gates H.
Figure 4:
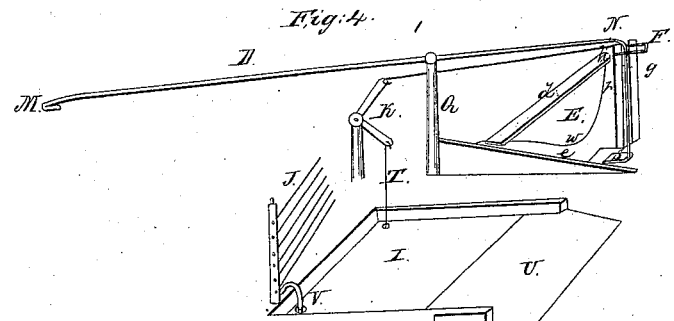
Fig. 4 is a section of the trap representing the double inclined plane, treadle, and inner gate, with the lever, hooks, &c.
Figure 5:
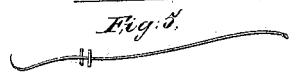

The operation of the trap is as follows: When a rat or any other object is placed on the threadle I it immediately sinks and presses upon the wire spring V Figs. 2 and 4 in the inner gate post, and thereby forces open that gate, while at the same time the lower point of the rocker K is drawn down by means of wire T on the same side; this throws forward the upper point of the same rocker, and consequently presses forward the wire hook Figs. 2 and 4 or r Fig. 1, which disengages the wire point, in the sliding gate, that rested on it, letting the sliding gate drop until the wire points in its edge (passing through the groove h, Fig. 4,) strikes the stirrup S on the lower end of the lever D, and thus tilts the back end of the lever until it disengages the hook on the point in the center pulley at M. The weight Y then produces half a revolution of the double sweep crank, and thus draws back the sliding gate, that last dropped, over the lower inclined plane e until the point in its edge passed from under the detached end of the wire spring W.—While at the same time the other gate rises over the upper inclined plane d until its point again rests on the hook F Figs. 2 and 4 or r Fig. 1, and at the same time the hook on the lever D at M catches on the opposite point of the pulley, and thus keeps the trap set ready for another operation. Thus the operation is continued, alternately opening and closing either side of the trap, until the weight is run down, when it must be again wound up.

What I claim as my invention, and desire to secure by Letters Patent is—

The sliding gates, double inclined planes, and stirrup lever, and their combination with the treadle, double sweep crank, weights, pulleys, rockers, slides and springs, as herein described, forming and constituting my trap, and by which my trap sets itself until the weight is run down.

LEVI KITTINGER.

Witnesses:
B. F. LEITER,
WILLIAM DUNBAR.